United States Patent [19]

Stedman

[11] 4,221,525

[45] Sep. 9, 1980

[54] APPARATUS FOR TRANSPORTING ELONGATED MEMBERS

[75] Inventor: Robert N. Stedman, Chillicothe, Ill.

[73] Assignee: Caterpillar Tractor Co., Peoria, Ill.

[21] Appl. No.: 937,398

[22] Filed: Aug. 28, 1978

[51] Int. Cl.³ ............................................... B60P 3/00
[52] U.S. Cl. ..................................... 414/460; 414/731
[58] Field of Search .......... 414/731, 460, 23, 458–459, 414/910; 254/92, 127; 294/106

[56] References Cited

U.S. PATENT DOCUMENTS

| | | | |
|---|---|---|---|
| 537,628 | 4/1895 | Boudinot | 414/460 |
| 810,980 | 1/1906 | Riddle | 254/92 |
| 3,709,390 | 1/1973 | Tanquay | 414/731 |
| 3,721,358 | 3/1973 | Brock | 414/460 |
| 3,841,507 | 10/1974 | Barwise | 414/731 |
| 3,972,431 | 8/1976 | Fischer | 294/106 X |
| 4,140,233 | 2/1979 | Muntjanoff et al. | 414/731 |

Primary Examiner—Stephen G. Kunin
Assistant Examiner—Lawrence E. Williams

Attorney, Agent, or Firm—William B. Heming

[57] ABSTRACT

An apparatus (10) is used for transporting one or more elongated members (12), such as logs (12) or pipes. The absence of developed roadways into tree cutting sites, for example, requires an apparatus (10) for transporting logs (12) over difficult terrain from the site to other locations. In the apparatus (10) for transporting the elongated member (12), first apparatus (20) controllably engages a first end portion (14) of the elongated member (12) in supporting relationship in response to being urged between the first end portion (14) and the ground (32) in a direction (34) generally longitudinal relative to the elongated member (12). Second apparatus (26) controllably engages a second end portion (16) of the elongated member (12) and maintains the first end portion (14) in supporting relationship with the first apparatus (20). Each of the first and second apparatus (20,26) controllably raises the first and second end portions (14,16) of the elongated member (12), respectively, for transporting the elongated member (12) in a position elevated above the ground (32).

31 Claims, 11 Drawing Figures

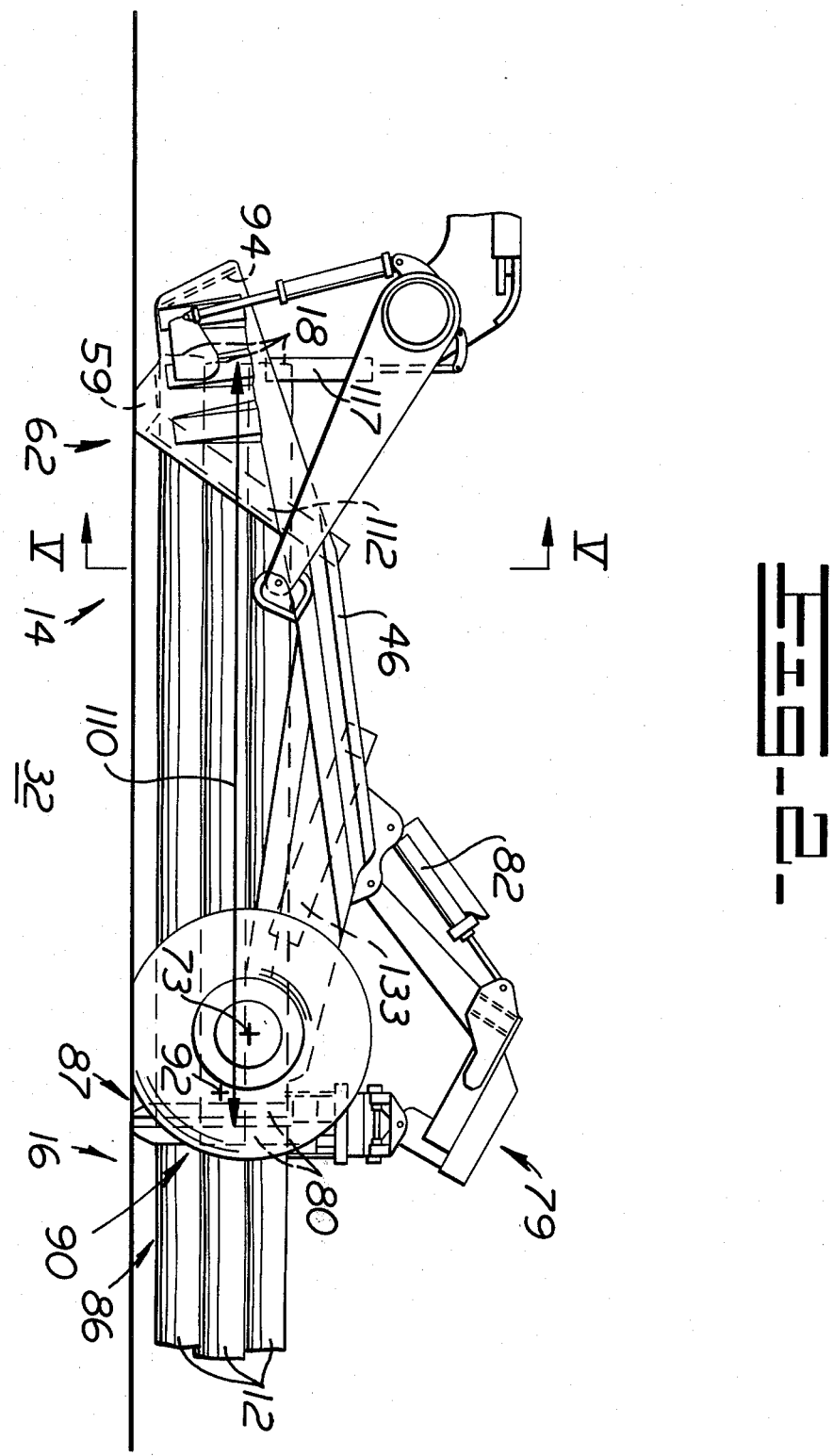

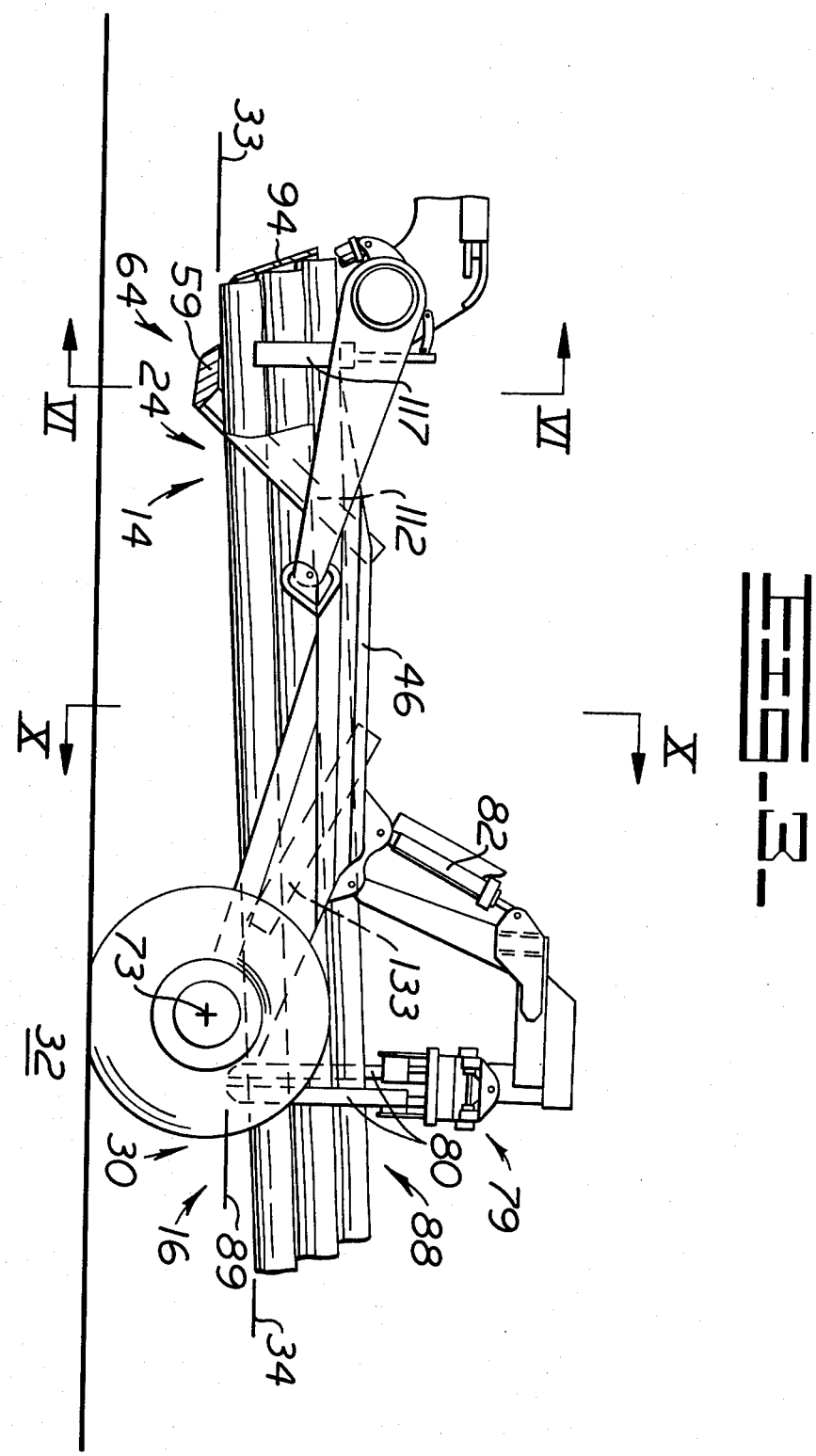

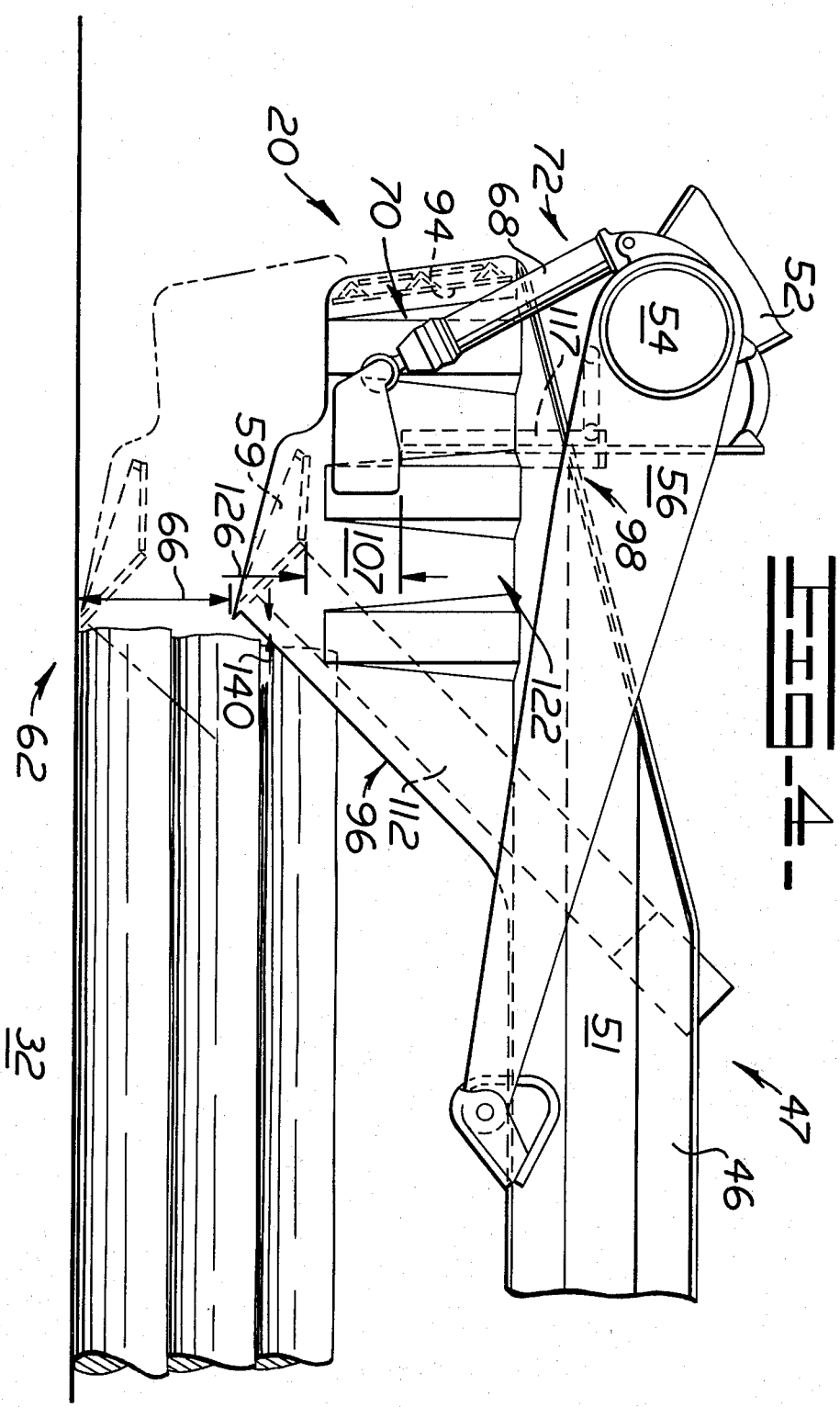

Fig_5_
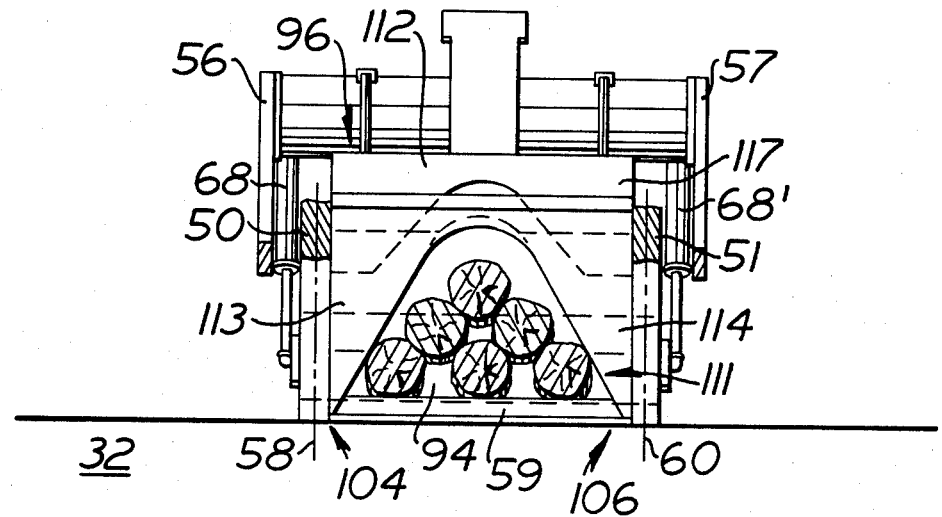
Fig_6_
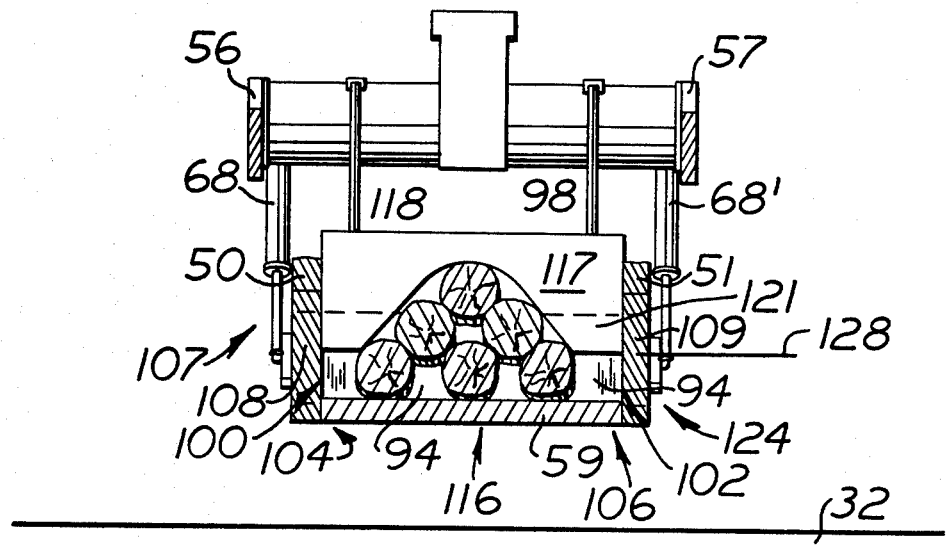

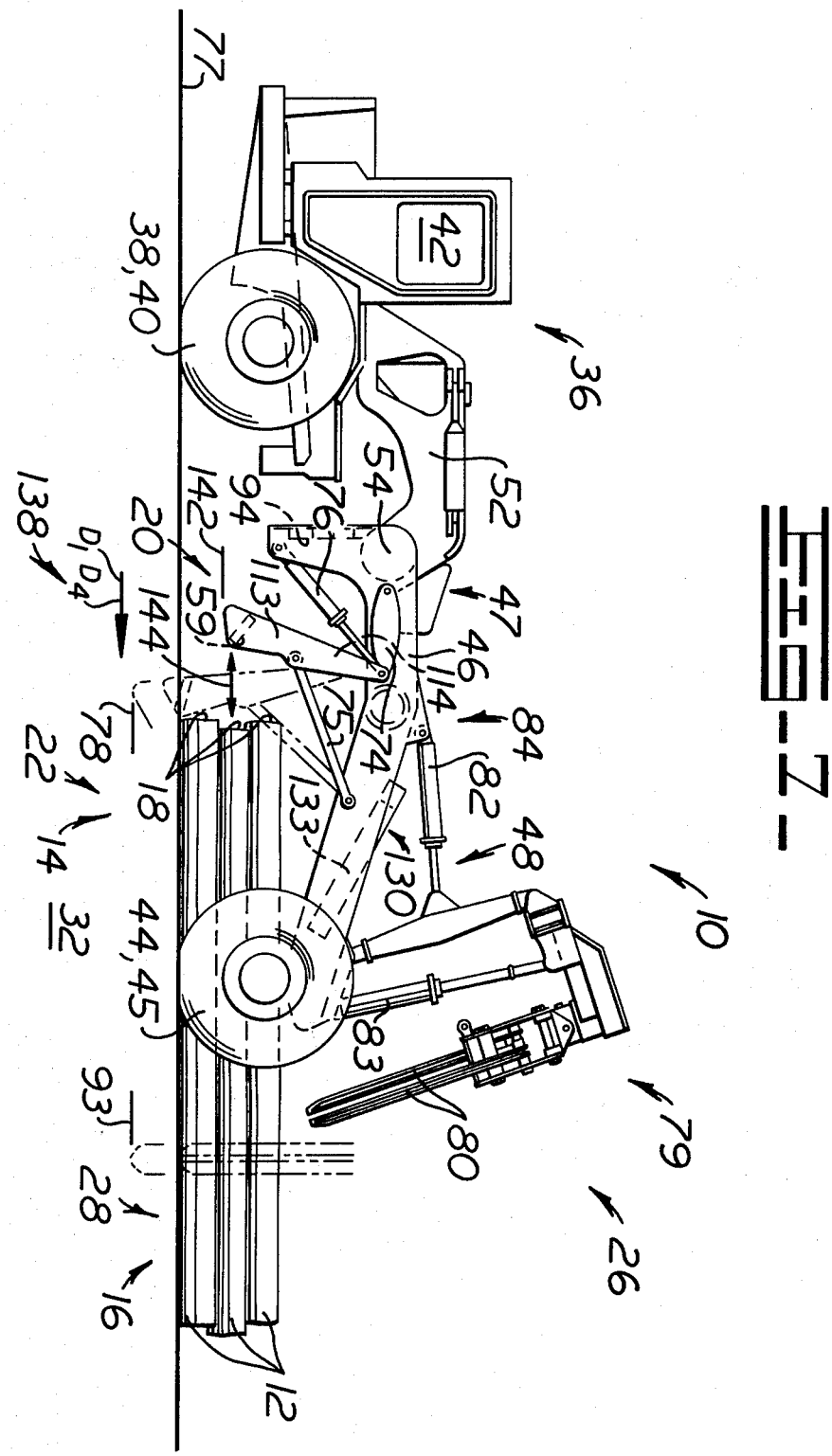

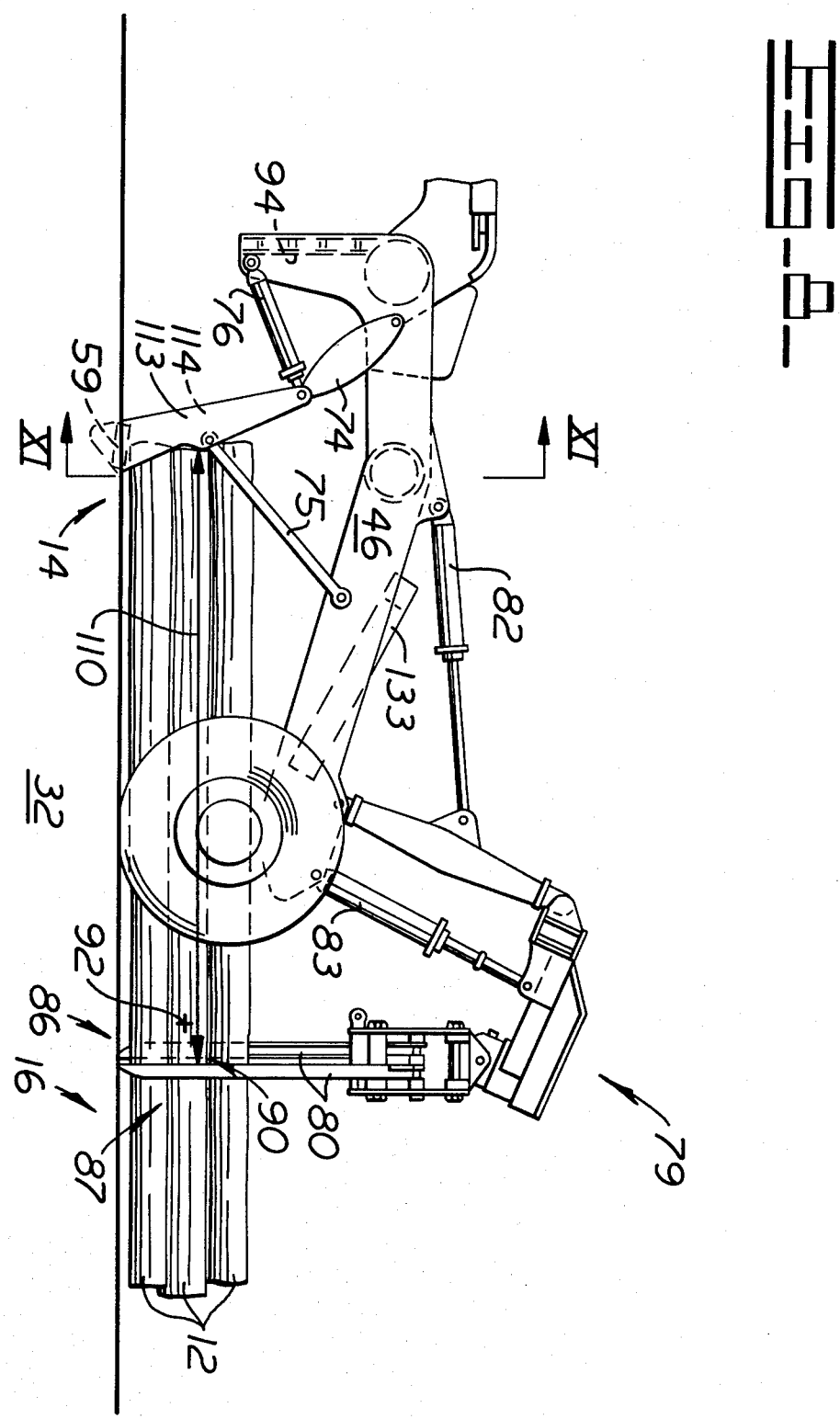

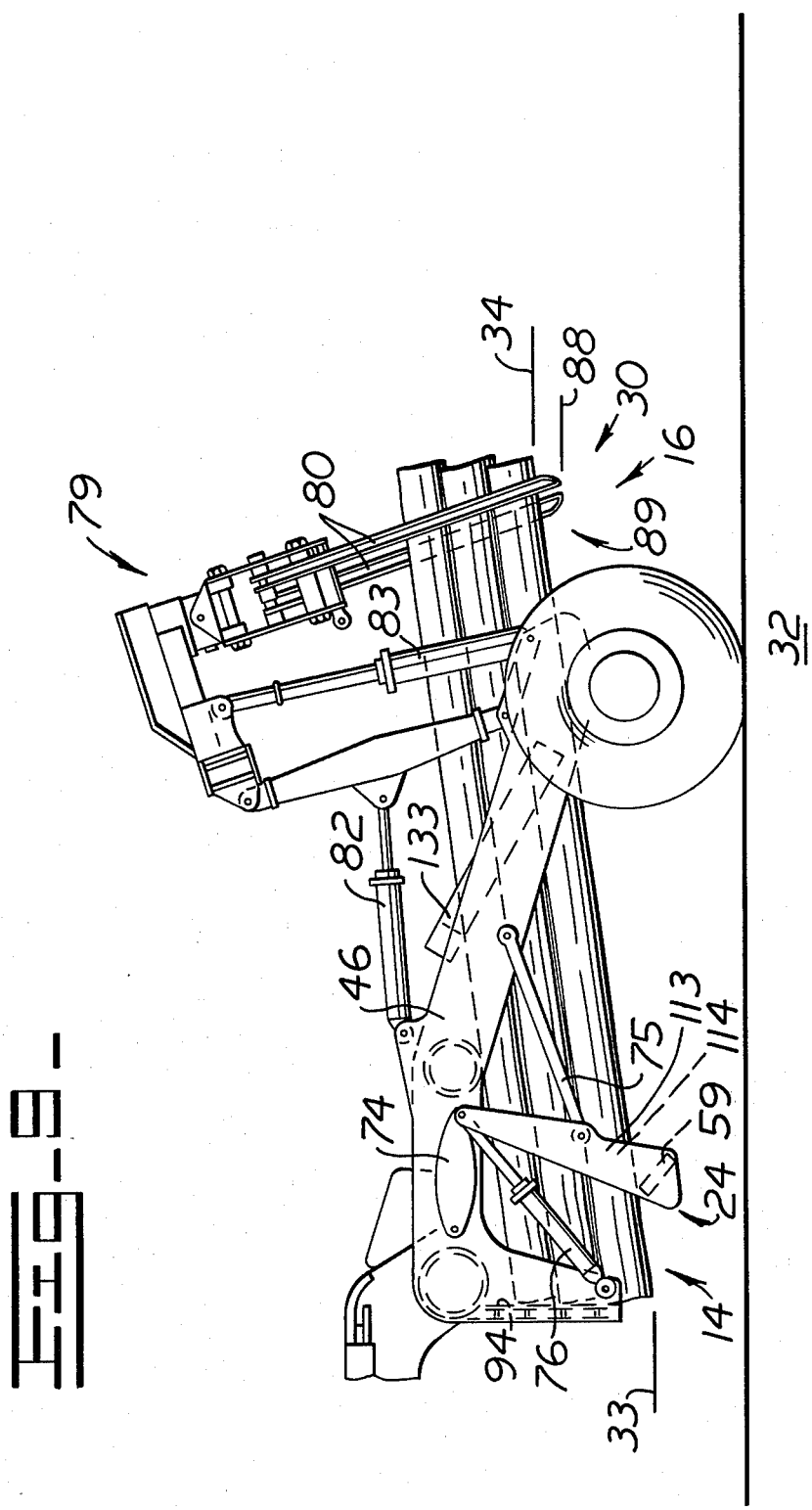

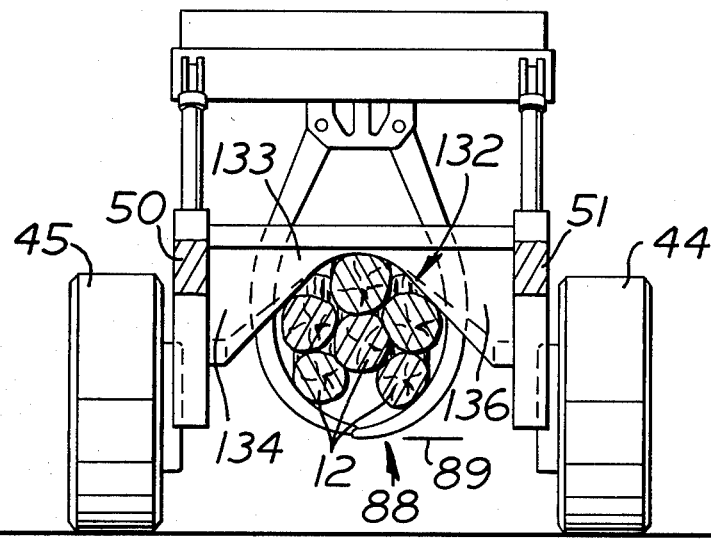
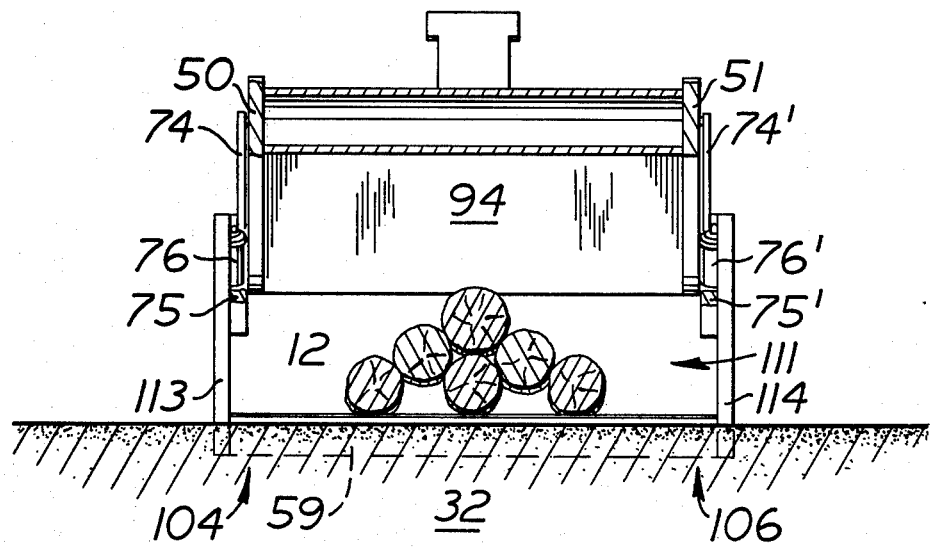

APPARATUS FOR TRANSPORTING ELONGATED MEMBERS

TECHNICAL FIELD

The invention relates to an apparatus for transporting an elongated member, such as a log or pipe. More particularly, the invention relates to the apparatus having first means for controllably engaging a first end portion of the elongated member in response to being urged between the ground and the first end portion and second means for controllably engaging a second end portion of the elongated member and maintaining said first end portion in supporting relationship with the first means.

BACKGROUND ART

In the use of an apparatus for transporting an elongated member such as a log or pipe, it is desirable to position the apparatus longitudinally over the elongated member and controllably engage first and second end portions of the elongated member. The elongated member is raised to an elevated position for transportation. This substantially overcomes the problems of transporting logs or pipe in areas having uneven terrain or roadways.

The invention relates to first means for controllably engaging a first end portion of the elongated member in response to being urged between the ground and said first end portion in a direction generally longitudinal relative to the elongated member. Second means controllably engages the second end portion of the elongated member and maintains the first end portion in supporting relationship with the first means. Each of said means also raises and lowers the respective one of the end portions of the elongated member between respective first and second positions.

U.S. Pat. No. 3,721,358 which issued to Brock on Mar. 20, 1973, discloses an over-the-road carrier that straddles an elongated load supported in a manner sufficient for freely moving first and second load engaging yokes into position under and around respective ends of the elongated load.

U.S. Pat. No. 537,628 which issued to Boudinot on Apr. 16, 1895, discloses a wagon using first and second lifting chains passed under an elongated member to support respective ends of the elongated member during transportation. U.S. Pat. No. 810,980, Jan. 30, 1906, issued to Riddle, similarly discloses a wagon using first and second log hooks transversely engaging respective ends of an elongated member for transportation purposes.

U.S. Pat. No. 3,972,431 which issued to Fischer on Aug. 3, 1976, discloses a grapple unit having grapple arms controllably transversely positionable about a load for securely engaging the load.

For example, an apparatus for transporting elongated members is commonly used in the transportation of logs from the cutting site to another location for further transportation or manufacturing operations. Heretofore, tractor-trailer combinations have been used to carry the logs. Such vehicles are generally loaded at the cutting site and then driven to other locations.

Owing to the inaccessibility of many cutting areas, it is generally necessary to build roadways into the cutting areas in order to provide access of the log carrier to the areas. For environmental purposes, the roadways must be substantially removed following final use of the cutting site. Therefore, it is desirable to provide a log carrying apparatus that is operable in remote areas over primitive or no road conditions in order to avoid construction of roadways into each cutting site. Cutting sites can be served by nearby existing roadway or transportation facilities or one roadway can be built having a location central to several cutting sites.

Additionally, log carriers generally involve many operator steps and/or additional operators and vehicles to assist the loading. Use of additional operators or vehicles and many steps in loading represents a waste of time and labor, especially in remote areas, owing to the necessity of additional facilities and services in the cutting areas.

Therefore, it is desirable to provide an apparatus for carrying elongated members that provides ease of loading and transportation under difficult conditions in order to substantially overcome the problems associated with operations in remote areas.

DISCLOSURE OF INVENTION

In one aspect of the invention, an apparatus for transporting an elongated member between first and second locations has first and second means. The first means is provided for controllably engaging a first end portion of the elongated member in supporting relationship and controllably raising and lowering said first end portion between first and second positions. The second means is provided for controllably engaging a second end portion of the elongated member and controllably raising and lowering said second end portion between first and second positions. The first and second end portions of the elongated member are each adjacent the ground at the respective first positions and each spaced a preselected height above said respective first positions at the respective second positions. Said first means engages the first end portion of the elongated member in response to being urged between the ground and said first end portion of the elongated member in a direction generally longitudinal relative to the elongated member. Said second means maintains said first end portion in supporting relationship with the first means.

An apparatus for transporting an elongated member is used, for example, to carry a log or a pipe or the like. Logs are cut in remote areas and often loaded and transported under difficult terrain conditions to developed roadways. In the log carrying apparatus, the first and second means controllably engage the logs to self-load the log carrying apparatus for transportation of the logs from the cutting site.

BRIEF DESCRIPTION OF DRAWINGS

FIG. 2 is a diagrammatic view showing the embodiment of FIG. 1 in greater detail;

FIG. 3 is a diagrammatic view showing the embodiment of FIG. 1 in still greater detail;

FIG. 4 is a diagrammatic partial view of FIG. 1;

FIG. 5 is a diagrammatic cross-sectional view taken along line V—V of FIG. 2;

FIG. 6 is a diagrammatic cross-sectional view taken along line VI—VI of FIG. 2;

FIG. 7 is a diagrammatic view showing another embodiment of the invention used for carrying logs;

FIG. 8 is a diagrammatic view showing the embodiment of FIG. 7 in greater detail;

FIG. 9 is a diagrammatic view showing the embodiment of FIG. 7 in still greater detail;

FIG. 10 is a diagrammatic cross-sectional view taken along line X—X of FIG. 3; and FIG. 11 is a diagrammatic cross-sectional view taken along line XI—XI of FIG. 8.

BEST MODE FOR CARRYING OUT THE INVENTION

Figure 1:
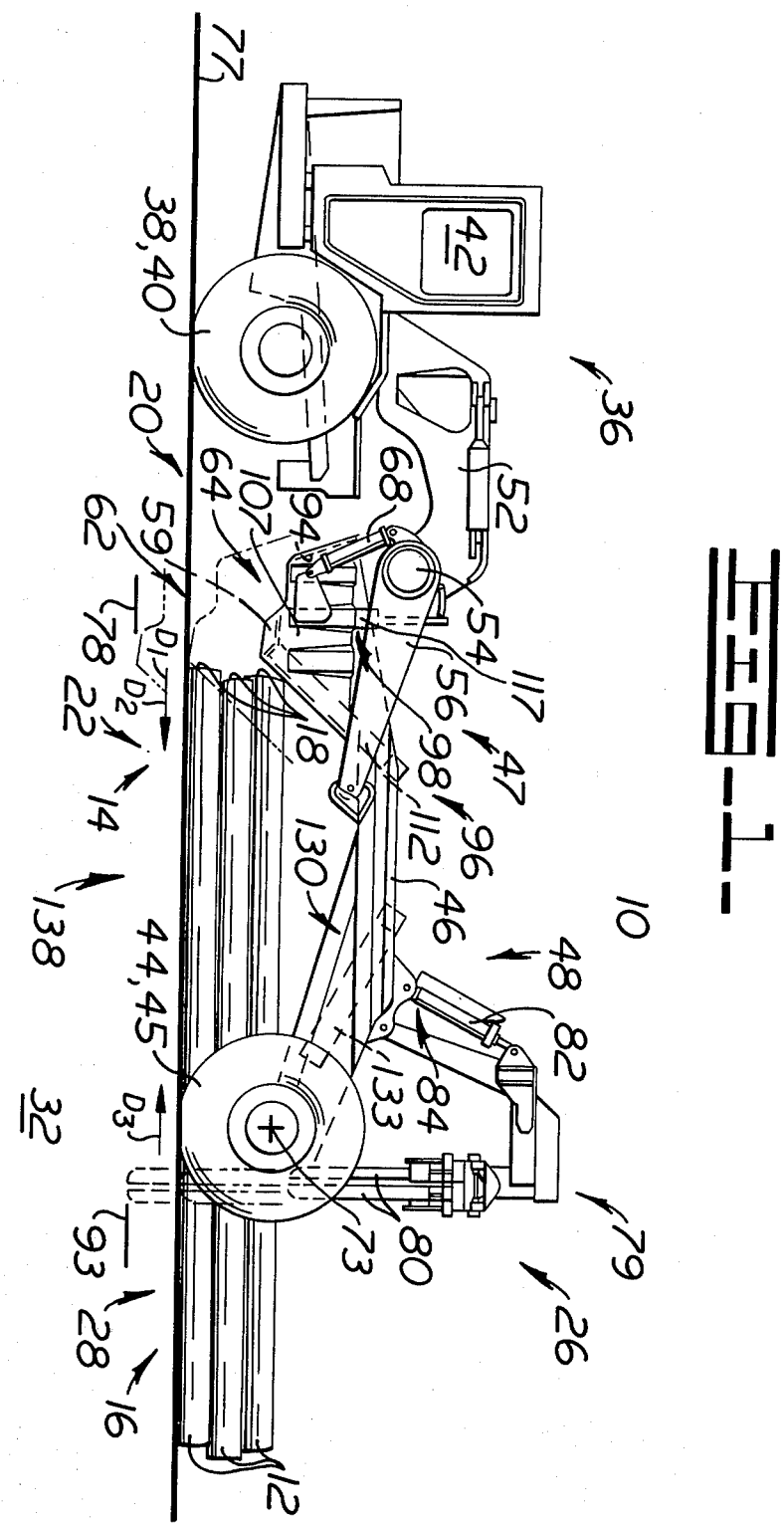
FIG. 1 is a diagrammatic view showing an embodiment of the invention used for carrying logs.

Referring to the drawings, particularly FIGS. 1 and 7, an apparatus 10 for transporting an elongated member 12 between first and second locations is shown, for example, as a log carrier 10. The elongated member 12 is, for example, a log 12 having first and second end portions 14,16 and a first end 18 related to said first end portion 14. Said first end portion 14 and said second end portion 16 can be reversed. As is shown, the log carrier 10 is preferably of a size sufficient for transporting a plurality of logs 12, each having first and second end portions 14,16 and first ends 18, between said first and second locations. The first and second locations are, for example, a tree cutting site and a central service area adjacent a roadway, respectively.

The log carrier 10 has first means 20 for controllably engaging the first end portions 14 of the logs 12 and controllably raising and lowering said first end portions 14 between first and second positions 22,24. Said log carrier 10 also has second means 26 for controllably engaging the second end portions 16 of the logs 12 and controllably raising and lowering said second end portions between first and second positions 28,30. At the respective first positions 22,28, said first and second end portions 14,16 are each adjacent the ground 32 (FIGS. 1 and 7). At the respective second positions 24,30, said first and second end portions 14,16 are each spaced a preselected height 33,34 above said respective first positions 22,28 (FIGS. 3 and 9). The first means 20 engages said first end portions 14 of the logs 12 in response to being urged between the ground 32 and the first end portion 14 at the first position 22 of said first end portion 14 in a direction $D_1$ generally longitudinal relative to the logs 12. The second means 26 maintains said first end portion 14 in supporting relationship with the first means 20. Said first and second means 20,26 are hereinafter more fully described.

It is desirable that the log carrier 10 include a tractor unit 36. The tractor unit 36 has first and second wheels 38,40 and an operator station 42. The log carrier 10 also has third and fourth wheels 44,45 and a frame 46. The frame 46 has first and second end portions 47,48 and preferably first and second spaced apart longitudinal members 50,51 (FIGS. 5, 6, 10 and 11). In equipping the log carrier 10 with the tractor unit 36, said log carrier 10 becomes a self-loading apparatus.

Referring to the embodiment of FIG. 1, the tractor unit 36 has a gooseneck 52, a draft tube 54, and first and second draft arms 56,57 extending from the draft tube 54. The first means 20 includes an engaging element 59 connected to the first end portion 47 of the frame 46 and controllably positionable between the ground 32 and the logs 12. The first and second longitudinal members 50,51 define substantially parallel spaced apart first and second planes 58,60 respectively. The engaging element 59 is preferably positioned between said planes 58,60 as is shown in FIG. 5.

The frame 46 is pivotally connected at the first end portion 47 to the tractor unit 36. The first and second draft arms 56,57 are pivotally connected to first and second longitudinal members 50,51 respectively. Said first end portion 47 of the frame 46 is controllably pivotally movable relative to the tractor unit 36 between first and second positions 62,64. At the first position 62, the engaging element 59 is positionable between the ground 32 and the logs 12, as is shown in FIG. 2 and in outline in FIGS. 1 and 4. At the second position 64, the engaging element 59 is spaced a preselected height 66 from said first position 62, as is best seen in FIG. 4.

A first double acting hydraulic cylinder 68 has first and second ends 70,72. Said cylinder 68 is connected at the first end 70 to the engaging element 59 and at the second end 72 to the tractor unit 36 (FIG. 4). Said cylinder 68 can also be reversed. In controllably operating the cylinder 68, the first end portion 47 of the frame 46 pivotally moves about an axis 73 between the first and second positions 62,64 for controllably moving the engaging element 59. Said axis 73 is the axis of rotation of the rear wheels 44,45 of the log carrier 10. The log carrier 10 shown has another hydraulic cylinder 68' similarly positioned on the opposite side of said carrier 10 (FIGS. 5 and 6).

Such tractor units 36 are well known in the scraper art and are used to pull scraper bowl assemblies for loading and discharging material loads. The operation of moving the first end portion 47 of the frame 46 between the first and second positions 62,64 is similar to the operation of positioning such scraper bowl assemblies. It should be understood that the tractor unit 36 and frame 46 can be of other configurations as is known in the art without departing from the invention.

Referring to the embodiment of FIG. 7, the tractor unit 36 is connected to the first end portion 47 of the frame 46. The first means 20 has the engaging element 59 and also includes first and second pivot arms 74,75 and a second hydraulic cylinder 76. The first and second pivot arms 74,75 are pivotally connected to the first end portion 47 of the frame 46 and the engaging element 59. The second hydraulic cylinder 76 is also connected to the first end portion 47 of the frame 46 and the engaging element 59 for controllably, pivotally moving the engaging element 59. Preferably, the first means 20 further includes another hydraulic cylinder 76' and additional pivot arms 74',75' similarly attaching the engaging element 59 to the frame 46 at the opposite side of said frame 46, as is best seen in FIG. 11. The structure connecting the engaging element 59 of both embodiments to the related positioning components such as, for example, the hydraulic cylinders 68,68', 76,76' is hereinafter more fully described.

The log carrier 10 has a surface plane of travel 77 defined by the contact points of the wheels 38,40,44,45 with the ground 32. The engaging element 59 is movable to an elevation 78 lower than said surface plane of travel 77 (FIGS. 1 and 7) for easing the loading operation, especially in uneven terrain. Preferably, said lower elevation 78 is at a distance of about 0.5 meters (1.5 feet) below said surface plane of travel 77.

The second means 26 controllably engages the second end portions 16 of the logs 12 in response to said second means 26 transversely encompassing said second end portions 16. The second means 26 is shown, for example, as a grapple tong assembly 79 having grapple tongs 80. Said grapple tong assembly 79 is pivotally connected to the second end portion 48 of the frame 46. Said grapple tongs 80 are of a construction sufficient for being urged between the ground 32 and the second end portions 16 of the logs 12. As is shown, the grapple tong assembly 79 has a third double acting hydraulic cylinder 82 having an end 84 connected to the frame 46. Said assembly 79 in the embodiment of FIG. 7 also includes a fourth cylinder 83 connected to the frame 46. Such grapple tong assemblies are well known in the art and are commonly used for engaging and moving loads. It should be understood that the first and second means 20,26 can be of other configurations as is known in the art without departing from the invention.

The grapple tong assembly 79 is pivotally movable between a first position 86 at which the grapple tongs 80 are encompassing a preselected area 87 (FIGS. 2 and 8) of the second end portions 16 of the logs 12 and a second position 88 at which said grapple tongs 80 are spaced a preselected height 89 from the first position 86 (FIGS. 3, 9 and 10). The grapple tongs 80 are also movable to an elevation 93 lower than the surface plane of travel 77 of the log carrier 10. Said lower elevation 93 is preferably at a distance of about 0.5 meters (1.5 feet) below said surface plane of travel 77 (FIGS. 1 and 7).

It is desirable that the log carrier 10 have a stop element 94 and third and fourth means 96,98, hereinafter more fully described. The stop element 94 is connected to the first end portion 47 of the frame 46. Said stop element 94 is positioned at a location sufficient for abutting said first ends 18 of the logs 12 in response to positioning the engaging element 59 between the first end portions 14 of the logs 12 and the ground 32.

The stop element 94 and engaging element 59 each have first and second end portions 100,102,104,106. In the embodiment of FIG. 1, first and second walls 108,109 are each preferably connected to a respective one of the end portions 100,102,104,106 of each of said engaging element 59 and stop element 94, as is best shown in FIG. 6. The result is a box type structure 107 for retaining the first end portions 14 of the logs 12 and withstanding the harsh operating conditions experienced by the log carrier 10. Said structure 107 connects the first hydraulic cylinders 68,68' to the engaging element 59.

Preferably, the grapple tong assembly 79 engages the second end portions 16 of the logs 12 encompassing the preselected area 87 at a preselected location 90 (FIGS. 2 and 8). The preselected location 90 is a distance 110 from the first ends 18 of the logs 12 at least equal to a distance from said first ends 18 to the center of gravity 92 of said logs 12. The distance 110 to said location 90 is preferably somewhat greater than the distance to the center of gravity 92. In lifting the logs 12 with the grapple tong assembly 79, therefore, said logs 12 tend to move in a forwardly depending direction. As a result, said logs 12 abut the stop element 94 and are maintained in supporting relationship with the engaging element 59 for being securely movable in position on the log carrier 10 (FIGS. 3 and 9).

The third means 96 is provided for positioning the first end portions 14 of the logs 12 at a preselected position 111 (FIGS. 5 and 11) relative to the log carrier 10 in response to the engaging element 59 being urged between the first end portions 14 of the logs 12 and the ground 32. Said third means 96 is shown as a first stacking member 112 connected to the engaging element 59. The engaging element 59 and first stacking member 112 are of a configuration sufficient for encompassing the first end portions 14 of the logs 12.

The first stacking member 112 has first and second side portions 113,114. Each of said side portions 113,114 is connected to a respective one of the end portions 104,106 of the engaging element 59. In the embodiment of FIG. 1, said first stacking member 112 is of "U" configuration and is connected to the first end portion 47 of the frame 46. Said first stacking member 112 is shown in detail in FIG. 5. In the embodiment of FIG. 7, the first stacking member 112 is formed by the first and second side portions 113,114. Said side portions 113,114 are substantially parallel and connect the engaging element 59 to the pivot arms 74,74', 75,75' and the hydraulic cylinders 76,76' (shown in detail in FIG. 11).

The fourth means 98, shown in FIG. 1, is provided for positioning the first end portions 14 of the logs 12 at a preselected position 116 relative to the log carrier 10 in response to the first means 20 moving said first end portions 14 toward the second position 24. As is shown in detail in FIG. 6, said fourth means 98 is a second stacking member 117 of "U" configuration and having first and second side portions 118,120. The second stacking member 117 is pivotally connected to the tractor unit 36 at a location sufficient for receiving the first end portions 14 of the logs 12 between said first and second side portions 118,120. Said second stacking member 117 is pivotally movable relative to the logs 12 between first and second positions 122,124. At the first position 122, the second stacking member 117 is spaced a preselected distance 126 from the engaging element 59, as is best seen in FIG. 4. At the second position 124, said stacking member 117 is spaced at an elevation 128 greater than said first position 122 (FIG. 6).

It is also desirable that the log carrier 10 include fifth means 130 for positioning the second end portions 16 of the logs 12 at a preselected position 132 (FIG. 10) relative to said log carrier 10 in response to the grapple tong assembly 79 moving the second end portions 16 of the logs 12 toward the second position 30. Said fifth means 130 is a third stacking member 133 of "U" configuration having first and second side portions 134,136. Said third stacking member 133 is connected to the second end portion 48 of the frame 46 and positioned at a location sufficient for receiving the second end portions 16 of the logs 12 between said first and second side portions 134,136.

It should be understood that the third, fourth and fifth means 96,98,130 can be of other configurations as is known in the art without departing from the invention.

INDUSTRIAL APPLICABILITY

In the operation of the log carrier 10, said log carrier 10 is positioned generally longitudinally over the logs 12. The engaging element 59 is urged between the ground 32 and the first end portions 14 of the logs 12 in order to position and support the logs 12 on said engaging element 59. The grapple tong assembly 79 transversely engages the logs 12 at the second end portions 16. Said logs 12 are then raised to a transporting position above the ground 32 in response to moving the engaging element 59 and grapple tong assembly 79 toward the respective second positions 24,30.

For example, the log carrier 10 is driven by an operator to a loading position 138 generally longitudinally straddling the logs (FIGS. 1 and 7). Referring to the preferred embodiment of FIG. 1, the first end portion 47 of the frame 46 is at the second position 64 in moving the log carrier 10 to said loading position 138. The engaging element 59 is spaced a preselected distance 140 longitudinally from the first ends 18 of the logs 12 (FIG. 4). Said distance 140 is dependent upon the lateral movement of the engaging element 59 in pivotally moving the first end portion 47 of the frame 46 toward the first position 62. The orientation of the engaging element 59 immediately adjacent end portions of the logs 12 at said first position 62 determines said adjacent end portions as the first end portions 14 of the logs 12.

The engaging element 59 is moved to a position at which said engaging element 59 is positionable between the ground 32 and the first end portions 14 of the logs 12 by moving the frame first end portion 47 to the first position 62 (shown in outline in FIGS. 1 and 4). The operator of the log carrier 10 is then prepared to urge the engaging element 59 between the ground 32 and the first end portions 14 of the logs 12.

The engaging element 59 is so urged in response to moving the log carrier 10 in a direction $D_2$ generally longitudinally relative to the logs 12 and/or said logs 12 being moved generally longitudinally relative to the engaging element 59 and in a direction $D_3$ toward the engaging element 59. The direction $D_2$ is substantially the same as the direction $D_1$ and substantially opposite the direction $D_3$. In the first of the above mentioned methods, the operator moves the log carrier 10 in a reverse direction from the loading position 138 in order to move the engaging element 59 toward the first end portions 14 of the logs 12 and, in effect, scoop up the logs 12. In the latter of the methods, the grapple tong assembly 79 engages the second end portions 16 of the logs 12 and raises said second end portions 16 toward the second position 30. The resultant forwardly depending movement of the logs 12, tends to move said logs 12 toward and onto the engaging element 59 (FIG. 2). The first end portion 47 of the frame 46 is then pivotally moved toward the second position 64 to raise the engaging element 59 and position the first end portions 14 of the logs 12 at the preselected height 66 from the first position 62 for transporting the logs 12 (FIG. 3). In typical loading situations, a combination of the above mentioned loading methods will be used depending upon conditions and operator preference.

Referring to the embodiment of FIG. 7, the engaging element 59 is similarly initially positioned at a preselected height 142 above the ground 32 and at a preselected distance 144 from the first end portions 14 of the logs 12 at the loading position 138. Said preselected distance 144 is dependent upon arcuately moving the engaging element 59 toward the first end portions 14 of the logs 12 in order to urge said engaging element 59 between said first end portions 14 and the ground 32 (shown in outline in FIG. 6).

The engaging element 59 is urged between the ground 32 and the first end portions 14 of the logs 12 in response to said engaging element 59 being pivotally moved relative to the log carrier 10 and in a direction $D_4$ generally longitudinal relative to the logs 12 (FIG. 7). Said direction $D_4$ is substantially the same as the direction $D_1$. In other words, the engaging element 59 is initially pivotally moved toward the first end portions 14 of the logs 12 for loading said logs 12. The engaging element 59 is urged between said first end portions 14 and the ground 32 to scoop up the logs 12 as a result of the pivotal movement of said engaging element 59.

The operator controllably actuates the second hydraulic cylinder 76 to pivotally move the engaging element 59. The engaging element 59 arcuately moves into engagement with the logs 12 owing to the positions of the pivot arms 74,74', 75,75'. Subsequent to being urged between the ground 32 and the first end portions 14 of the logs 12, the engaging element 59 is raised upwardly to position said first end portions 14 at the second position 24 for transporting the logs 12 (FIG. 9). The grapple tong assembly 79 is used in combination with the pivotally moving engaging element 59 in order to properly engage and load the first end portions 14 of the logs 12.

In urging the engaging element 59 between the ground 32 and the first end portions 14 of the logs 12, said first end portions 14 are moved into position onto and in supporting relationship with the engaging element 59. The first ends 18 of the logs 12 also tend to move toward the stop element 94 (FIGS. 2 and 8). In effect, the logs 12 are displaced longitudinally relative to the log carrier 10 and moved across the engaging element 59 and between the first and second side portions 113,114 of the first stacking member 112. The stacking member 112 tends to shape and stack the logs 12 by selectively receiving and generally conforming logs to the shape of said stacking member 112 during the loading operation (FIG. 5). For example, the "U" shaped stacking member 112 shown in FIG. 2, tends to move the inner logs 12 downwardly the outer logs 12 outwardly and to form a stack during the loading operation.

Where present, the second stacking member 117 also tends to shape and stack the first end portions 14 of the logs 12. If the log carrier 10 is not carrying a load, said second stacking member 117 remains at the first position 122 relative to the engaging element 59 owing to the force of gravity on said second member 117 (FIG. 1). During the loading of the log carrier 10, said second stacking member 117 receives the first end portions 14 of the logs 12. This also tends to assist in the stacking and shaping of the logs 12 (FIGS. 2 and 5). The second stacking member 117 moves toward the second position 124 in response to the first end portions 14 of the logs 12 being raised toward the second position 24 (FIG. 6). The weight of said second stacking member 117 implements the stacking action by resisting the upward movement of the logs 12. A hydraulic cylinder or other means can also be added for additional resistance to the upward movement of the logs 12.

In the operation of the grapple tong assembly 79, the second hydraulic cylinder 82 is actuated by the operator to pivotally move said assembly 79 and position the grapple tongs 80 relative to the second end portions 16 of the logs 12. The grapple tongs 80 are initially positioned transversely relative to the logs 12 (FIGS. 1 and 7). Said tongs 80 are then urged between the ground 32 and the second end portions 16 of the logs 12 to encompass the preselected area 87. This is the first position 86 of said grapple tong assembly 78 (FIGS. 2 and 8). The assembly 79 is moved toward the second position 88 to raise the second end portions 16 to the preselected height 89 for transportation and to maintain the position of the first end portions 14 of the logs 12 relative to the engaging element 59, stop element 94 and other components associated with the first end portion 47 of the frame 46 (FIGS. 3, 9, 10). The location of the center of gravity 92 of the logs 12 relative to the grapple tong assembly 79 tends to maintain said position of the first end portions 14 of the logs 12.

The third stacking member 133 operates integrally with the grapple tong assembly 79. In moving the grapple tong assembly 79 toward the second position 88, the second end portions 16 of the logs 12 are moved between the first and second side portions 134,136 of said stacking member 133. The "U" configuration tends to shape and stack the logs 12 in a manner similar to that of the first stacking member 112. At the second position 88 of the grapple tong assembly 79, the second end portions 16 of the logs 12 are secured by the grapple tongs 80 in contact with said third stacking member 133 and prevented from moving during travel of the log carrier 10.

In the above described manner, the logs 12 are controllably engaged and raised to positions above the ground 32 for transportation from the first to the second location. At said second location, the logs 12 are lowered to the ground 32 and disengaged from the grapple tongs 80. In the embodiment of FIG. 2, the log carrier 10 is then driven in a forward direction from the position straddling the logs 12 to disengage the first end portions 14 of the logs 12 from the engaging element 59. In the embodiment of FIG. 7, the hydraulic cylinders 76,76' are actuated to pivotally move the engaging element 59 from engagement with the first end portions 14 of the logs 12.

Other aspects, objects and advantages will become apparent from a study of the specification, drawings and appended claims.

What is claimed is:

1. In an apparatus (10) for transporting an elongated member (12) between first and second locations, said elongated member (12) having first and second end portions (14,16), said apparatus (10) having first means (20) for controllably engaging said first end portion (14) in supporting relationship and controllably raising and lowering said first end portion (14) between first and second positions (22,24) and second means (26) for controllably engaging said second end portion (16) and controllably raising and lowering said second end portion (16) between first and second positions (28,30), said first end portion (14) being in contact with the ground (32) and said second end portion (16) being adjacent the ground (32) at the respective first positions (22,28) and spaced a preselected height (33,34) above said respective first positions (22,28) at the respective second positions (24,30), the improvement comprising:

said first means (20) engaging said first end portion (14) in response to being urged into digging engagement with and along the ground (32) between the ground (32) and said first end portion (14) at the first position (22) of said first end portion (14) in a direction ($D_1$) generally longitudinal relative to the elongated member (12); and said second means (26) maintaining said first end portion (14) in supporting relationship with the first means (20).

2. The apparatus, as set forth in claim 1, wherein the first means (20) is urged between the ground (32) and the first end portion (14) of the elongated member (12) in response to moving the apparatus (10) in a direction ($D_2$) generally longitudinal relative to the elongated member (12).

3. The apparatus, as set forth in claim 1, wherein the first means (20) is urged between the ground (32) and the first end portion (14) of the elongated member (12) in response to said first means (20) being pivotally moved relative to the apparatus (10) and in a direction ($D_4$) generally longitudinal relative to the elongated member (12).

4. The apparatus, as set forth in claim 1, wherein the first means (20) is urged between the ground (32) and the first end portion (14) of the elongated member (12) in response to said elongated member (12) being moved generally longitudinally relative to said first means (20) and in a direction ($D_3$) toward said first means (20).

5. The apparatus, as set forth in claim 1, wherein said apparatus (10) is of a size sufficient for transporting a plurality of elongated members (12).

6. The apparatus, as set forth in claim 1, including a frame (46) having first and second end portions (47,48) and wherein the first means (20) includes an engaging element (59) connected to the first end portion (47) of the frame (46) and controllably positionable between the ground (32) and the elongated member (12).

7. The apparatus, as set forth in claim 6, including a tractor unit (36) and wherein the frame (46) is pivotally connected at the first end portion (47) to said tractor unit (36), said first end portion (47) of the frame (46) being controllably pivotally movable relative to said tractor unit (36) between a first position (62) at which the engaging element (59) is positionable between the ground (32) and the elongated member (12) and a second position (64) at which said engaging element (59) is spaced a preselected height (66) from said first position (62).

8. The apparatus, as set forth in claim 7, including a hydraulic cylinder (68) having first and second ends (70,72) and being connected at the first end (70) to the engaging element (59) and at the second end (72) to the tractor unit (36).

9. The apparatus, as set forth in claim 7, including fourth means (98) for positioning the first end portion (14) of the elongated member (12) at a preselected position (116) relative to the apparatus (10) in response to the first means (20) moving the first end portion (14) of the elongated member (12) toward the second position (24).

10. The apparatus, as set forth in claim 7, wherein the apparatus (10) has a surfaced plane of travel (77) and wherein the engaging element (59) is movable to an elevation (78) lower than said surface plane of travel (77).

11. The apparatus, as set forth in claim 10, wherein said lower elevation (78) is at a distance of about 0.5 meters (1.5 feet) below said surface plane of travel (77).

12. The apparatus, as set forth in claim 6, wherein the elongated member (12) has a first end (18) and including a stop element (94) connected to the first end portion (47) of the frame (46) and positioned at a location sufficient for abutting said first end (18) of the elongated member (12) in response to positioning the engaging element (59) between the first end portion (14) of the elongated member (12) and the ground (32).

13. The apparatus, as set forth in claim 12, wherein the stop element (94) and engaging element (59) each have first and second end portions (100,102,104,106) and including first and second walls (108,110) each connected to a respective one of the end portions (100,102,104,106) of said stop element (94) and engaging element (59).

14. The apparatus, as set forth in claim 6, including third means (96) for positioning the first end portion (14) of the elongated member (12) at a preselected position (116) relative to the apparatus (10) in response to the engaging element (59) being urged between the first end portion (14) of the elongated member (12) and the ground (32).

15. The apparatus, as set forth in claim 14, wherein the third means (96) is a first stacking member (112) connected to the engaging element (59), said engaging element (59) and first stacking member (112) being of a configuration sufficient for encompassing the first end portion (14) of the elongated member (12).

16. The apparatus, as set forth in claim 15, wherein the engaging element (59) has first and second end portions (104,106) and the first stacking member (112) is of a "U" configuration and has first and second side portions (112,114), said side portions (112,114) each being connected to a respective one of the end portions (104,106) of the engaging element (59).

17. The apparatus, as set forth in claim 6, including fifth means (130) for positioning the second end portion (16) of the elongated member (12) at a preselected position (132) relative to the apparatus (10) in response to the second means (26) moving the second end portion (16) of the elongated member (12) toward the second position (30).

18. The apparatus, as set forth in claim 6, wherein the frame (46) has first and second space apart longitudinal members (50,51) defining substantially parallel, spaced apart first and second planes (58,60) and wherein the engaging element (59) is positioned between said first and second planes (58,60).

19. The apparatus, as set forth in claim 1, wherein the second means (26) controllably engages the second end portion (16) of the elongated member (12) in response to said second means (26) transversely encompassing said second end portion (16).

20. The apparatus, as set forth in claim 19, wherein the second means (26) is a grapple tong assembly (79) having grapple tongs (80) and being pivotally connected to the second end portion (48) of the frame (46), said grapple tongs (80) being of a construction sufficient for being urged between the ground (32) and the second end portion (16) of elongated member (12).

21. The apparatus, as set forth in claim 20, wherein the grapple tong assembly (79) has a double acting hydraulic cylinder (82) having an end (84) connected to the frame (46).

22. The apparatus, as set forth in claim 20, wherein the grapple tong assembly (79) is pivotally movable between a first position (86) at which the grapple tongs (80) are encompassing a preselected area (87) and a second position (88) at which said grapple tongs (80) are spaced a preselected height (89) from the first position (86).

23. The apparatus, as set forth in claim 20, wherein the apparatus (10) has a surface plane of travel (77) and wherein the grapple tongs (80) are movable to an elevation (78) lower than said surface plane of travel (77).

24. The apparatus, as set forth in claim 23, wherein said lower elevation (78) is at a distance of about 0.5 meters (1.5 feet) below said surface plane of travel (77).

25. The apparatus, as set forth in claim 1, wherein the elongated member (12) has a first end (18) and the second means (26) engages the second end portion (16) of the elongated member (12) at a preselected location (90), said preselected location (90) being a distance (110) from said first end (18) of at least equal to a distance from the first end (18) to the center of gravity (92) of the elongated member (12).

26. An apparatus (10) for transporting an elongated member (12) between first and second locations, said elongated member (12) having first and second end portions (14,16), comprising:

a frame (46) having first and second end portions (47,48);

an engaging element (59) connected to the first end portions (47) of the frame (46) and being of a construction sufficient for engaging the first end portion (14) of the elongated member (12) in supporting relationship and controllably raising and lowering said first end portion (14) between a first position (22) at which said first end portion (14) is adjacent the ground (32) and a second position (24) at which said first end portion (14) is spaced a preselected height (33) above the first position (22), said engaging element (59) engaging said first end portion (14) in response to being urged between the ground (32) and said first end portion (14) at the first position (22) of said first end portion (14) in a direction (35) generally longitudinal relative to the elongated member (12);

third means (96) for positioning the first end portion (14) of the elongated member (12) at a preselected position (111) relative to the apparatus (10) in response to the engaging element (59) being urged between said first end portion (14) and the ground (32);

a grapple tong assembly (79) having grapple tongs (80) and being pivotally connected to the second end portion (48) of the frame (46) and being of a construction sufficient for controllably engaging said second end portion (16) and controllably raising and lowering said second end portion (16) between a first position (28) at which said second end portion (16) is adjacent the ground (32) and a second position (30) at which said grapple tongs (80) are spaced a preselected height (89) above the first position (28), said grapple tong assembly (79) engaging said second end portion (16) of the elongated member (12) in response to transversely encompassing said second end portion (16), said grapple tongs (80) being of a construction sufficient for being urged between the ground (32) and said second end portion (16); and fifth means (130) for positioning the second end portion (16) of the elongated member (12) at a preselected position (132) relative to the apparatus (10) in response to said grapple tong assembly (79) moving said second end portion (16) toward the second position (30).

27. The apparatus, as set forth in claim 26, including a tractor unit (36) and wherein the frame (46) is pivotally connected at the first end portion (47) to said tractor unit (36), said first end portion (47) of the frame (46) being controllably pivotally movable relative to said tractor unit (36) between a first position (62) at which the engaging element (59) is positionable between the ground (32) and the elongated member (12) and a second position (64) at which said engaging element (59) is spaced a preselected height (66) from said second position (64).

28. An apparatus (10) for transporting an elongated member (12) between first and second locations, said elongated member (12) having first and second end portions (14,16) comprising:

a tractor unit (36);

first means (20) for engaging said first end portion (14) of the elongated member (12) in supporting relationship and controllably raising and lowering said first end portion (14) between a first position (22) at which said first end portion (14) is adjacent the ground (32) and a second position (24) at which said first end portion (14) is spaced a preselected height (33) above said first position (22), said first means (20) including an engaging element (59) and engaging said first end portion (14) in response to being urged between the ground (32) and said first end portion (14) at the first position (22) of said first end portion (14) in a direction ($D_1$) generally longitudinal relative to the elongated member (12), said engaging element (59) being controllably positionable between the ground (32) and the elongated member (12);

a frame (46) having first and second end portions (47,48) and being pivotally connected at the first end portion (47) to said tractor unit (36) and connected at the first end portion (47) to the engaging element (59), said first end portion (47) of the frame (46) being controllably pivotally movable relative to said tractor unit (36) between a first position (62) at which the engaging element (59) is positionable between the ground (32) and the elongated member (12) and a second position (64) at which said engaging element (59) is spaced a preselected height (66) from said first position (62);

second means (26) for engaging said second end portion (16) of the elongated member (12), controllably raising and lowering said second end portion (16) between a first position (28) at which said second end portion (16) is adjacent the ground (32) and a second position (30) at which said second end portion (16) is spaced a preselected height (34) above said first position (28) and maintaining said first end portion (14) of the elongated member (12) in supporting relationship with the first means (20); and fourth means (98) for positioning the first end portion (14) of the elongated member (12) at a preselected position (116) relative to the apparatus (10) in response to the first means (20) moving the first end portion (14) of the elongated member (12) toward the second position (24).

29. The apparatus, as set forth in claim 28, wherein the fourth means (98) is a second stacking member (117) of "U" configuration having first and second side portions (118,120) and being pivotally connected to the tractor unit (36) at a location sufficient for receiving the first end portion (14) of the elongated member (12) between said first and second side portions (118,120), said second stacking member (117) being pivotally movable relative to the engaging element (59) between a first position (122) at which said second stacking member (117) is spaced a preselected distance (126) from the engaging element (59) and a second position (124) at which said second stacking member (117) is spaced at an elevation (128) greater than said first position (122).

30. In an apparatus (10) for transporting an elongated member (12) between first and second locations, said elongated member (12) having first and second end portions (14,16), said apparatus (10) having first means (20) for controllably engaging said first end portion (14) in supporting relationship and controllably raising and lowering said first end portion (14) between first and second positions (22,24) and second means (26) for controllably engaging said second end portion (16) and controllably raising and lowering said second end portion (16) between first and second positions (28,30), said first and second end portions (14,16) each being adjacent the ground (32) at the respective first positions (22,28) and spaced a preselected height (33,34) above said respective first positions (22,28) at the respective second positions (24,30), the improvement comprising:

a frame (46) having first and second end portions (47,48);

said first means (20) including an engaging element (59) and engaging said first end portion (14) in response to being urged between the ground (32) and said first end portion (14) at the first position (22) of said first end portion (14) in a direction ($D_1$) generally longitudinal relative to the elongated member (12), said engaging element (59) being connected to the first end portion (47) of the frame (46) and controllably positionable between the ground (32) and the elongated member (12);

said second means (26) maintaining said first end portion (14) in supporting relationship with the first means (20); and means (130) for positioning the second end portion (16) of the elongated member (12) at a preselected position (132) relative to the apparatus (10) in response to the second means (26) moving the second end portion (16) of the elongated member (12) toward the second position (30).

31. The apparatus, as set forth in claim 30, wherein the fifth means (130) is a third stacking member (133) of "U" configuration having first and second side portions (134,136) and being connected to the second end portion (48) of the frame (46) and positioned at a location sufficient for receiving the second end portion (16) of the elongated member (12) between said first and second side portions (134,136).

* * * * *